(12) United States Patent
Kashef et al.

(10) Patent No.: US 6,808,111 B2
(45) Date of Patent: *Oct. 26, 2004

(54) TERMINAL SOFTWARE ARCHITECTURE FOR USE WITH SMART CARDS

(75) Inventors: Forough Kashef, Fremont, CA (US); Jean-Paul Billon, San Francisco, CA (US); Christophe Colas, Versailles (FR); Lance Shigeo Nakamura, Aiea, HI (US); Thomas H. Sak, Santa Cruz, CA (US)

(73) Assignee: Visa International Service Association, Foster City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,502

(22) Filed: Aug. 5, 1999

(65) Prior Publication Data

US 2002/0175207 A1 Nov. 28, 2002

Related U.S. Application Data

(60) Provisional application No. 60/095,608, filed on Aug. 6, 1998.

(51) Int. Cl.[7] .................................................. G06K 7/00
(52) U.S. Cl. ........................ 235/380; 235/379; 235/381; 235/383; 705/41; 705/43
(58) Field of Search ................................. 235/375, 379, 235/380, 381, 383, 492; 705/41, 43, 35; 902/8, 22, 39

(56) References Cited

U.S. PATENT DOCUMENTS

| | | | |
|---|---|---|---|
| 5,029,077 A | * 7/1991 | Fatahalian et al. | 345/112 |
| 5,036,461 A | 7/1991 | Elliott et al. | 364/408 |
| 5,352,875 A | 10/1994 | Enomoto | 235/380 |
| 5,392,353 A | 2/1995 | Morales | |
| 5,396,558 A | 3/1995 | Ishiguro et al. | |
| 5,673,418 A | * 9/1997 | Stonier et al. | 703/23 |
| 5,682,027 A | 10/1997 | Bertina et al. | 235/380 |
| 5,764,894 A | * 6/1998 | Boucher et al. | 703/23 |
| 6,012,050 A | * 1/2000 | Eaton et al. | 705/42 |
| 6,018,717 A | * 1/2000 | Lee et al. | 705/13 |
| 6,105,008 A | 8/2000 | Davis et al. | 705/41 |
| 6,119,946 A | 9/2000 | Teicher | 235/492 |
| 6,199,762 B1 | * 3/2001 | Hohle | 235/492 |
| 6,308,887 B1 | * 10/2001 | Korman et al. | 235/379 |

FOREIGN PATENT DOCUMENTS

| | | | | |
|---|---|---|---|---|
| WO | WO 96/25724 | 8/1996 | | G07F/7/10 |
| WO | 96/38826 | 12/1996 | | G07F/1/10 |
| WO | 98/19237 | 5/1998 | | G06F/9/46 |

(List continued on next page.)

*Primary Examiner*—Michael G. Lee
*Assistant Examiner*—Ahshik Kim
(74) *Attorney, Agent, or Firm*—Beyer Weaver & Thomas LLP

(57) ABSTRACT

A terminal software architecture accepts a card that implements a card application of a merchant. A terminal application is developed independently of the terminal. The terminal has an environment component including terminal hardware, an operating system, and an environment services layer that supplies one or more environment dependent services that are dependent upon at least one of the operating system and the hardware of the terminal. The terminal application is compatible with the card application and has a platform independent portion that is independent of the environment component and a business logic layer that implements business policies associated with the terminal. The business logic layer makes calls to the terminal application through an access module and an application programming interface. The terminal application makes calls to the environment services layer through an access module and an application programming interface.

31 Claims, 10 Drawing Sheets

Terminal
Software Architecture

FOREIGN PATENT DOCUMENTS

| | | | |
|---|---|---|---|
| WO | 98/25238 | 6/1998 | ............. G07F/7/10 |
| WO | 98/25239 | 6/1998 | ............. G07F/7/10 |
| WO | WO 98/43427 | 10/1998 | |
| WO | WO 00/04717 | 1/2000 | |
| WO | WO 01/08113 | 2/2001 | |
| WO | WO 01/09851 | 2/2001 | |

* cited by examiner

TERMINAL SOFTWARE ARCHITECTURE FOR USE WITH SMART CARDS

RELATED APPLICATIONS

This application claims priority of U.S. Provisional Application No. 60/095,608 filed on Aug. 6, 1998 and entitled "Open Platform Terminal Architecture", which is hereby incorporated by reference.

FIELD OF THE INVENTION

The present invention relates generally to smart card terminals. More specifically, the present invention relates to a terminal software architecture that allows terminal applications to be portable to multiple terminals.

BACKGROUND OF THE INVENTION

In today's technologically advanced society, businesses often issue cards to consumers for making transactions and so that their purchases and other transactions may be tracked. For example, many businesses currently make use of so-called "loyalty" programs that reward customers for frequent purchase of the business's products or services. Well known loyalty programs include frequent flyer mileage programs, frequent guest programs at hotels, programs to reward frequent purchases at food markets, etc. Such loyalty programs may make use of a plastic card with an embossed customer number to help keep track of a customer's purchases. Others use a magnetic stripe card which can magnetically store information such as customer name and identification number, number of purchases, points awarded, etc. Still other loyalty programs have been implemented using a smart card in conjunction with a terminal at a loyalty operator's place of business. Other software programs that implement stored-value applications, debit applications, etc., ("applications") are also implemented using consumer smart cards and terminals at businesses. It is therefore important to ensure that the cards and corresponding terminals are compatible. Although such compatibility has been successfully tested to date, there are a number of disadvantages to the way the testing is currently being performed.

Traditionally, card and terminal suppliers have independently received a functional specification for a new smart card-based application. Working asynchronously and semi-autonomously, the suppliers create card and terminal application programs from the functional specification. However, considerable latitude in the interpretation of the functional specification exists, often resulting in incompatible card and terminal implementations. As a result, additional development and testing time has been required to resolve the discrepancies.

The traditional situation is further aggravated by the complexity of programming chip cards and their low-level interface to the terminal. Therefore, demand for chip card-based applications places considerable pressure on a scarce pool of qualified people generally resulting in an extended time-to-market period.

Typically, the cards and terminals are designed, tested, and produced in parallel. More particularly, the production of a terminal includes manufacture of the back-end system for handling the data for the terminal as well as the terminal application that runs on the terminal. Similarly, the production of a card such as a smart card includes creating the card application (i.e., code) that is to be loaded onto the smart card. Together, the back-end system, terminal application and card application implement the overall application, such as a loyalty application.

FIG. 1 is a diagram illustrating a conventional method of producing compatible card and terminal applications. As shown, an application designer 102 (such as Visa International) produces separate specifications for the card application, the terminal application, and the back-end system that are given to the different corresponding manufacturer and systems developers. The back-end system specification 104 is given to a back-end system developer 110, the terminal application specification 106 is given to a terminal manufacturer 112, and the card application specification 108 is given to a card manufacturer 114 for independent development. Once the back-end system, the terminal application, and the card application are completed, the completed products are provided to the application designer for certification testing. Certification testing 116 is then performed to test the functionality and compatibility of the completed products. Once testing is completed, the products are produced 118.

While the certification process may appear to be straight forward, it is important to note that it is typically desirable to design a card application that is compatible with terminals manufactured by a variety of terminal manufacturers. As a result, the conventional certification process is repeated for each such terminal to verify the functionality of the terminal as well as the compatibility of the terminal with the card application. Accordingly, since the certification process is performed for each different terminal, the certification process is a long and tedious process.

In addition, although the specifications for each of the products (e.g., terminal and card applications) are written such that the resulting products will be compatible, there are often multiple interpretations for a given specification. As a result, there may be discrepancies between the interpretation of a specification and the resulting implementation by a given manufacturer (e.g., terminal and card manufacturers). It is therefore necessary to repeat the certification process until all discrepancies are resolved. This method of production is therefore a time-consuming and expensive one.

As described above, each terminal application is designed and written for use with a specific terminal. That is, a conventional terminal application is typically written using proprietary libraries and software maintained by the terminal manufacturer. FIG. 2 is a diagram illustrating a conventional terminal architecture for terminal A. As shown, a terminal application 202 is specifically designed and written for use with terminal A. In addition, the terminal application 202 directly uses operating system 204. While libraries 206 may serve to standardize such terminal applications, the libraries typically include files that are proprietary to the manufacturer's development, including hardware 208. As a result, such a terminal application 202 cannot easily be altered to accommodate different terminals.

Although terminal applications cannot easily be altered to be compatible with different terminals, the number and capability of terminals are expanding. In addition to electronic point of sale systems, EFT/POS terminals and ATMs, non-traditional points of interaction require card acceptance in kiosks, personal computers, network computers and consumer applicances such as smart phones, television set-top boxes and advanced electronic game systems.

As described above, while libraries may provide some standardization for the production of terminals and terminal applications, each terminal application must still be written such that it is compatible with a specific operating system and hardware. For instance, a diagram illustrating a conventional terminal architecture for terminal B is illustrated in FIG. 3. A terminal application 210 is written specifically for terminal B, which interacts directly with the operating system 212 provided in terminal B. Similarly, the application 210 uses libraries 214 that are specific to terminal B and the associated hardware 216. Therefore, even where different terminal applications are designed and written to be compatible with the same card application, the terminal applications must also be compatible with the operating system and hardware of the specific terminals. As a result, it is impossible to run the same terminal application on terminals manufactured by different terminal manufacturers. Thus, for a given loyalty application, while there may be a single card application, there may be multiple terminal applications required due to the different types of terminals. For example, terminal applications 202 and 210 are different, yet still implement the same loyalty application.

In view of the above, it would be beneficial if a terminal architecture were developed that would permit terminal and card applications to be developed in parallel such that the resulting applications are guaranteed to be compatible. Moreover, it would be desirable if a terminal application designed for use with a specific card application could be used with different terminals.

SUMMARY OF THE INVENTION

The present invention provides methods and apparatus for ensuring compatibility of terminal and card applications produced in parallel, and therefore faster deployment and certification of terminal applications. This is accomplished through providing a terminal architecture that permits terminal applications to be written independent of the operating system and hardware of the terminal.

According to one embodiment of the invention, a terminal software architecture and associated terminal for accepting a smart card implementing a card application of a merchant is presented. Through the use of this terminal architecture, terminal application and card applications can be developed in parallel such that the resulting applications are guaranteed to be compatible. Moreover, through the use of the present invention, a terminal application designed for use with a specific card application can be used with different terminals.

According to one aspect, a terminal software architecture for accepting a smart card that implements a card application of a merchant includes an environment component and a terminal application compatible with the card application and having a platform independent portion that is independent of the environment component. The platform independent portion will be hereinafter referred to as the chip logic component (CLC). The environment component includes hardware of the terminal, an operating system of the terminal, and an environment services layer that supplies one or more environment dependent services dependent upon at least one of the operating system and the hardware of the terminal. Thus, the environment component functions as the platform dependent component of a terminal application.

According to another aspect of the invention, the environment component includes an environment services layer and a business logic layer (BLL). The environment services layer supplies platform dependent services and the BLL represents the policies established, for example, by the entity placing the terminal.

According to yet another aspect of the invention, the terminal architecture further includes a first application programming interface and a second programming interface. The first application programming interface enables the terminal application to communicate with the environment services layer, wherein the environment dependent services provided by the environment services layer are accessible by the platform independent portion of the terminal application through the first programming interface. The second application programming interface enables the business logic layer to communicate with the terminal application. Thus, the CLC can indirectly access terminal equipment using the first application programming interface.

The present invention provides a terminal software architecture which allows a platform independent portion of a terminal application (CLC) to be developed. Since the CLC is platform and environment independent, the CLC is compatible with all terminals implementing the disclosed terminal architecture. This permits application designers to create and deploy a single CLC module that supports an application across all terminals implementing the disclosed architecture. Moreover, since the CLC is compatible with all terminals implementing this architecture, the time required to complete verification testing associated with these terminals is dramatically reduced.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

According to one embodiment of the invention, a terminal software architecture and associated terminal for accepting a smart card implementing a card application of a merchant is presented. Through the use of this terminal architecture, terminal application and card applications can be developed in parallel such that the resulting applications are guaranteed to be compatible. Moreover, through the use of the present invention, a terminal application designed for use with a specific card application can be used with different terminals.

Preferred Embodiments

Figure 1:
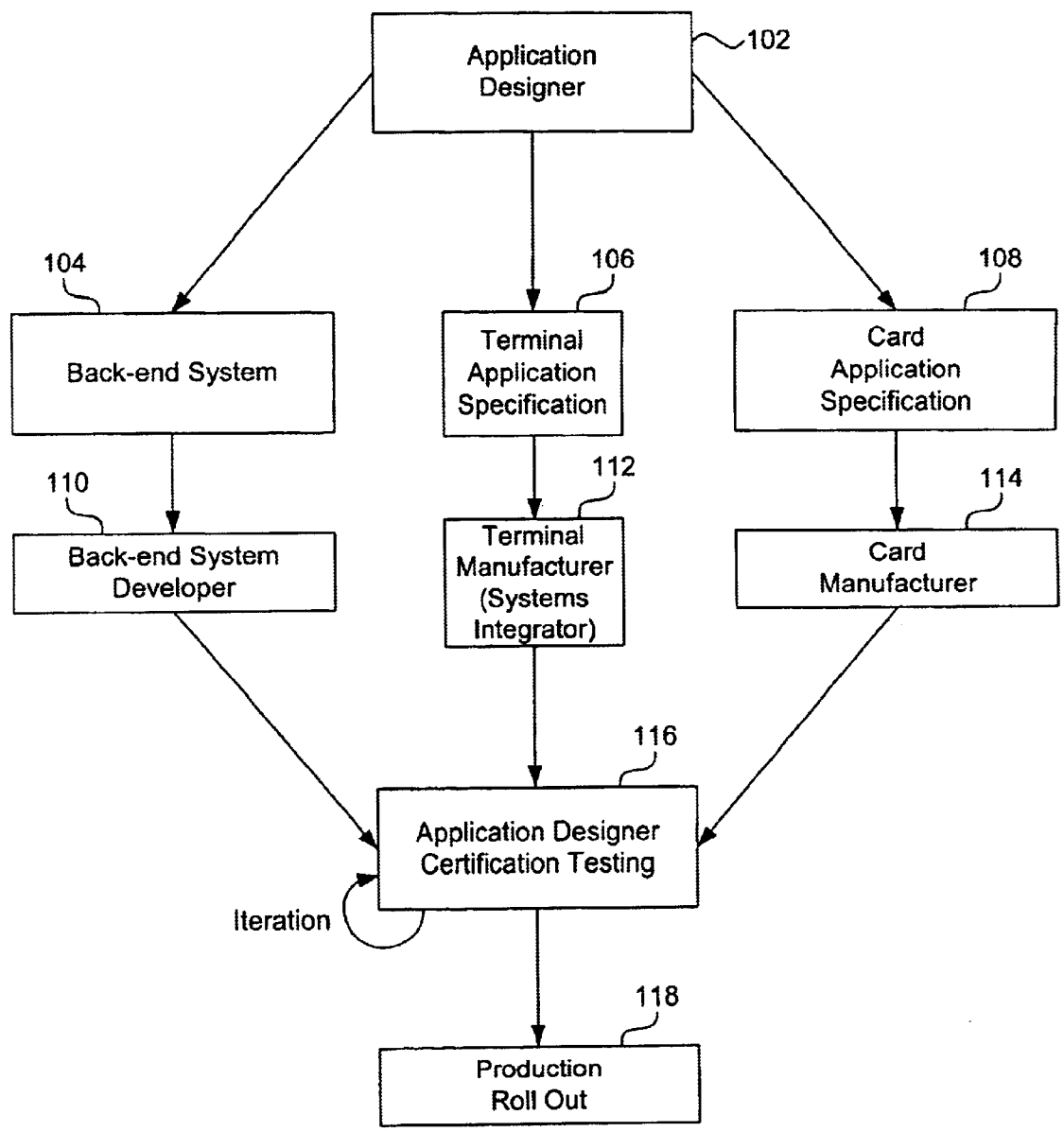
FIG. 1 is a diagram illustrating a conventional method of producing compatible card and terminal applications.
Figure 2:
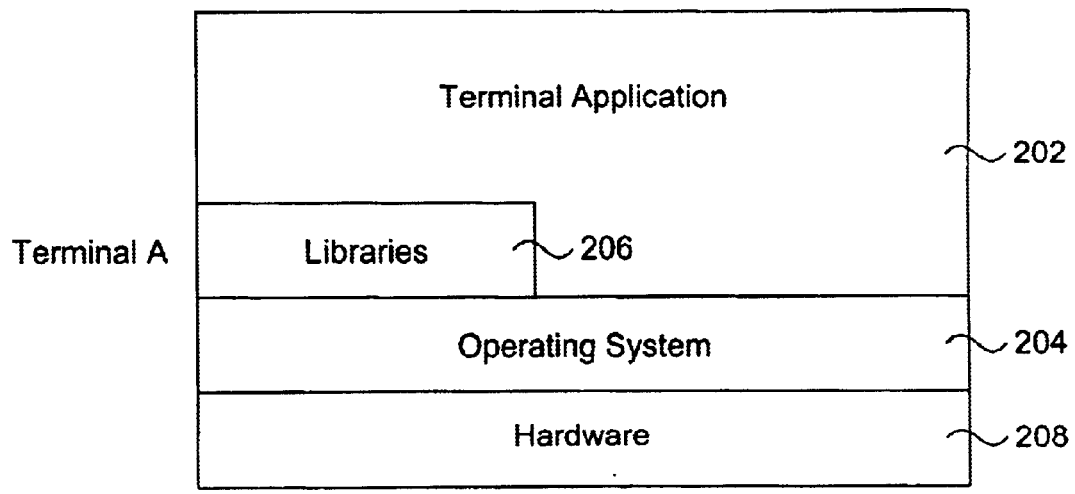
FIG. 2 is a diagram illustrating a conventional terminal architecture of terminal A.
Figure 3:
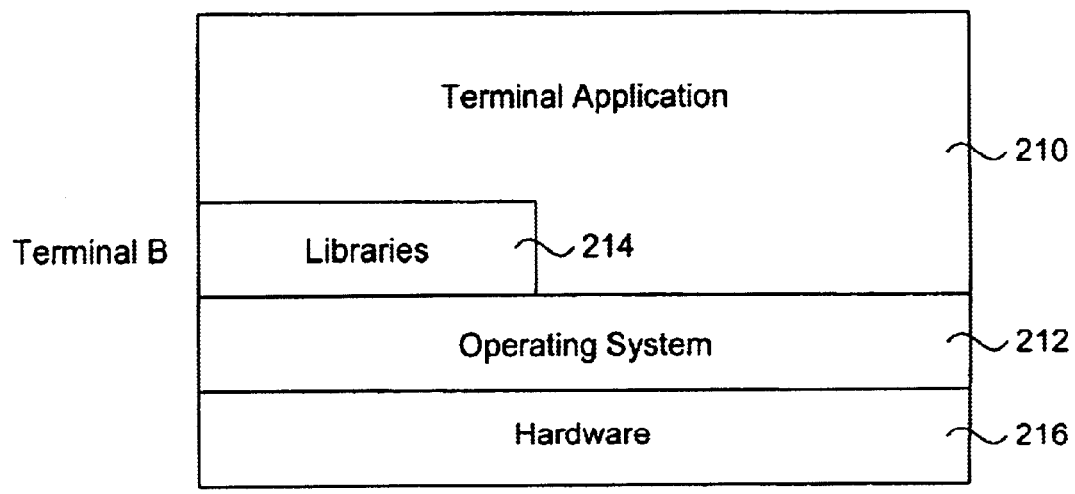
FIG. 3 is a diagram illustrating a conventional terminal architecture of terminal B.
Figure 4:
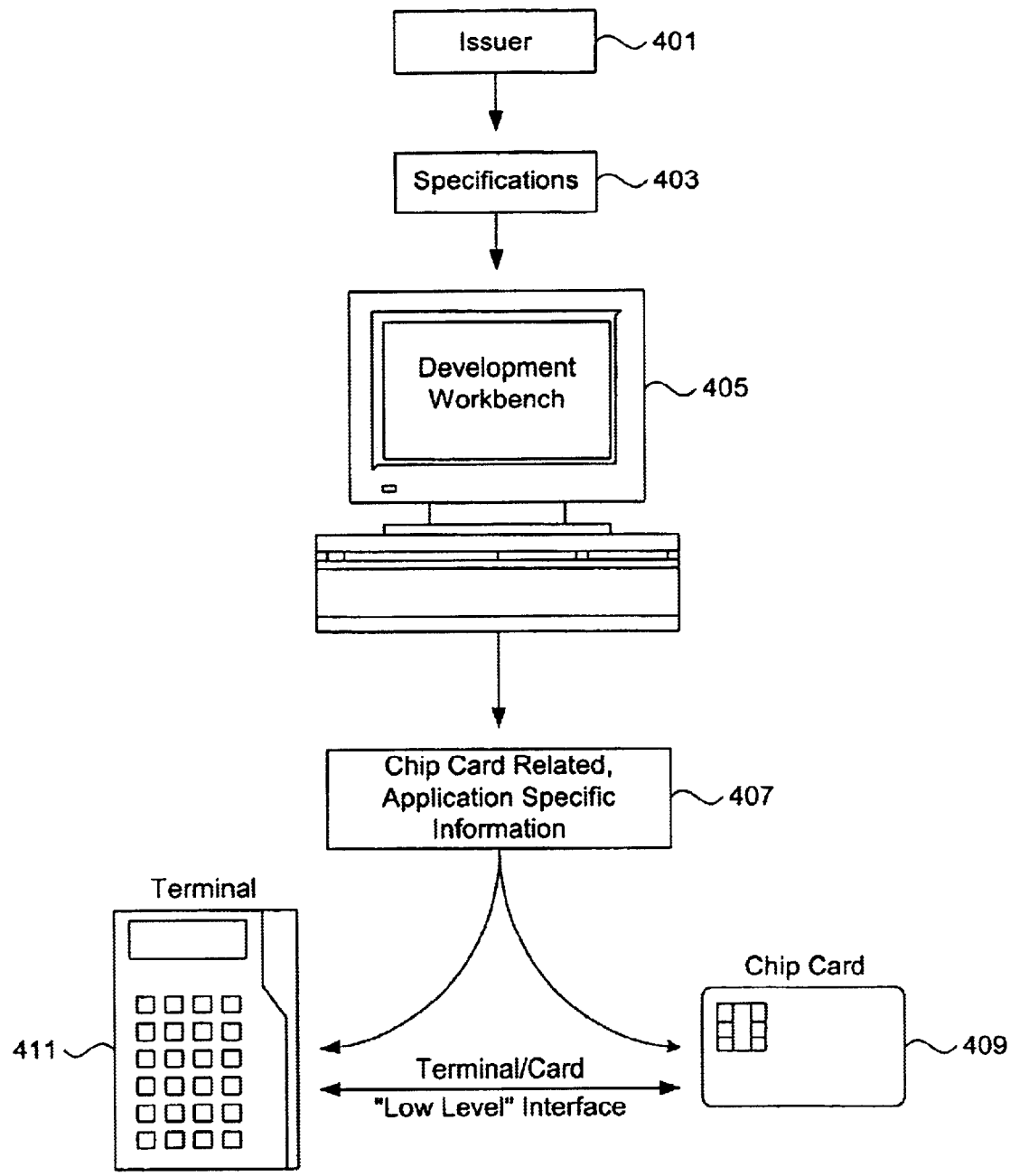
FIG. 4 is a block diagram illustrating the development of a smart card application and a terminal application using a single specification according to one embodiment of the invention.

Referring now to FIG. 4, a block diagram illustrating the development of a smart card application and a terminal application using a single specification according to one embodiment of the invention is presented. A card issuer 401 (e.g., Visa) personalizes new cards received from a card supplier and then issues these cards to customers. Personalization may also be performed by the card supplier or by a personalization bureau. The issuer 401 may be any suitable issuing entity such as a bank, financial institution, telecommunications network operator, a service association, a merchant or other organization, or even an agent acting for an issuer.

During the design and development stages, the issuer 401 provides specifications 403 which are developed in a development environment 405 for use in the development of smart cards and terminals. In this manner, the specifications 403 are refined to include smart card related and application specific information 407. Thus, a smart card application 409 and a terminal application 411 are developed in a coordinated manner from the same specifications 403. Accordingly, application designers may accept a single functional specification of a smart card based application and create separate components for use in the smart card and the terminal.

Also termed chip cards, integrated circuit cards, memory cards or processor cards, a smart card is typically a credit card-sized plastic card that includes one or more semiconductor integrated circuits. A smart card can interface with a point-of-sale terminal, an ATM, or with a card reader integrated with a computer, telephone, vending machine, or a variety of other devices. The smart card may be programmed with various types of functionality such as a stored-value application, a credit or debit application, a loyalty application, cardholder information, etc. Although a plastic card is currently the medium of choice for smart cards, it is contemplated that a smart card may also be implemented in a smaller form factor, for example, it may attach to a key chain or be as small as a chip module. A smart card may also be implemented as part of a personal digital assistant, telephone (such as a subscriber identification module), or take a different form. The below description provides an example of the possible elements of a smart card, although the present invention is applicable to a wide range of types of smart cards.

A smart card may include a microprocessor, random access memory (RAM), read-only memory (ROM), non-volatile memory, an encryption module (or arithmetic unit), and a card reader (or terminal) interface. Other features may be present such as optical storage, flash EEPROM, FRAM, a clock, a random number generator, interrupt control, control logic, a charge pump, power connections, and interface contacts that allow the card to communicate with the outside world. Of course, a smart card may be implemented in many ways, and need not necessarily include a microprocessor or other features.

Various mechanical and electrical characteristics of a smart card and aspects of its interaction with a card reader device are described in *Smart Card Handbook*, W. Rankl and W. Effing, John Wiley & Sons, Ltd., 1997, and are defined by the following specifications, all of which are incorporated herein by reference: *Visa Integrated Circuit Card Specification*, Visa International Service Association, 1996; *EMV Integrated Circuit Card Specification for Payment Systems*, *EMV Integrated Circuit Card Terminal Specification for Payment Systems*, *EMV Integrated Circuit Card Application Specification for Payment Systems*, Visa International, Mastercard, Europay, 1996; and *International Standard; Identification Cards—Integrated Circuit(s) Cards with Contacts, Parts 1–6*, International Organization for Standardization, 1987–1995.

Application code is any suitable code for loading onto a smart card and may represent one application or many. In one embodiment, applications are written in the JAVA programming language, although assembly language, Visual Basic, C, and other languages may also be used to write applications.

The terminal implementing the terminal architecture of the present invention may be any suitable terminal such as are known in the art for reading from, and writing to, a smart card, or the like. In general, the present invention is applicable for use with a wide variety of terminals. By way of example, the terminal may be a terminal manufactured by Verifone, Hypercom, Bull/Ingenico, or other manufacturer that produces a similar terminal.

Also termed interface device (IFD), card accepting device (CAD), chip card reader (CCR), smart card adapter and card reader device, a terminal may be any suitable interface device that functions to transfer information and commands between a smart card and a user and/or a computing device. A terminal may also supply an interface to a magnetic stripe card. A terminal may be a non-intelligent device that simply provides power to a card and facilitates the transfer of information, or may be as complex as a merchant terminal that includes a processor, application software, and the ability to communicate over a network.

A terminal may take any of a variety of physical forms and may be a stand alone unit, integrated with a computer, attached to the keyboard of a computer, a PCMCIA card, or may even be built in to a floppy disk-sized unit capable of being read from a disk drive of a computer, etc. Furthermore, a terminal may also be embodied in any portable device such as a laptop computer, a cellular telephone, or any variety of a personal digital assistant (PDA).

Terminal Software Architecture

Figure 5:
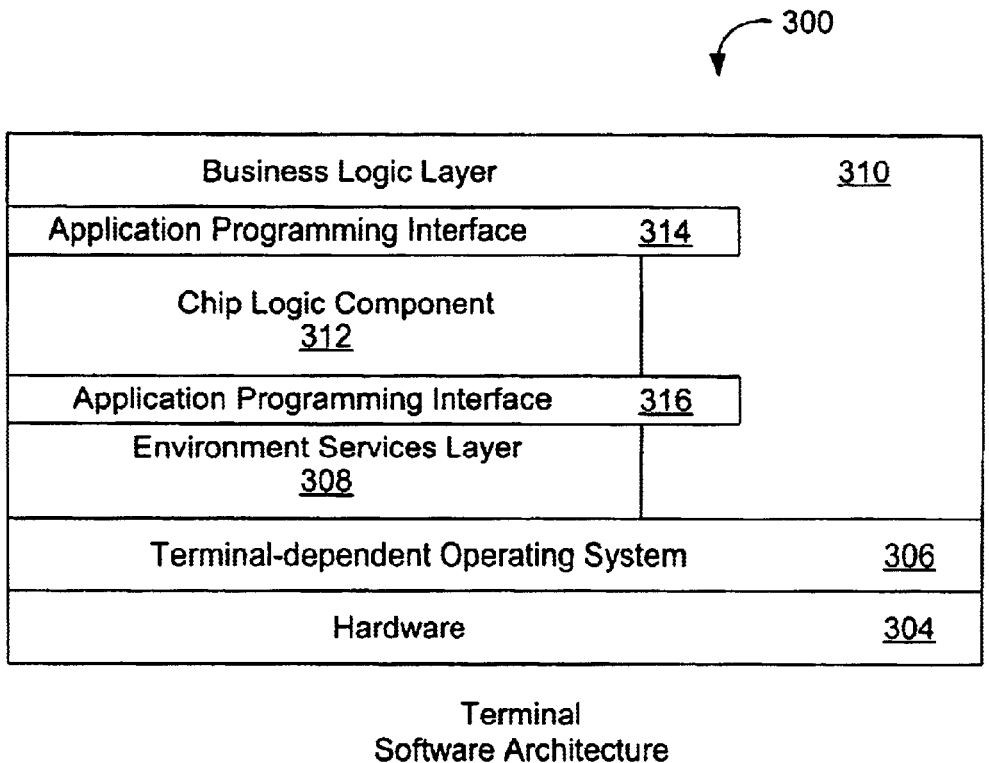
FIG. 5 is a block diagram illustrating a terminal software architecture according to an embodiment of the invention.

The present invention enables a terminal application to be written that can run on any terminal. This is accomplished through the implementation of a novel terminal software architecture. FIG. 5 is a block diagram illustrating a terminal software architecture 300 according to an embodiment of the invention. As shown in FIG. 5, the architecture permits modular decomposition of the software of a terminal to enable a terminal application to be written so that it is platform independent. The terminal architecture illustrated in FIG. 5 includes multiple layers, each layer using the layers below it. It is important to note that the terminal includes an environment component 302 that is separate from the portion that is platform independent. The environment component 302 is platform dependent and includes the hardware 304 produced by the terminal manufacturer and the operating system 306. The operating system 306 is unique to the type of terminal and therefore dependent on the terminal hardware 304. The operating system 306 provides a hospitable environment for the execution of terminal applications. More particularly, the operating system 306 is responsible for a wide variety of functions including memory management, scheduling and dispatching processor tasks, supporting file systems, and managing the physical devices that constitute the terminal (e.g., display, keyboard, telecommunication adapter and modem, printer, etc.). In addition, various utility programs, such as software download utilities, are sometimes included as operating system components.

It is important to note that the terminal architecture of the present invention does not require modifications to the operating system 306. Terminal platform providers have the option to incorporate a Java Virtual Machine and run-time environment into their operating system or they can add a Java Virtual Machine and run-time environment as a separate program. Alternative implementations of the terminal architecture of the present invention include a Java implementation of the entire terminal application, a Java implementation of the CLC 312 with the environment component implemented in another language, and the use of the CLC 312 and a platform specific "terminal framework" only as a "reference implementation" to guide development efforts. Platform providers create their terminal framework implementation only one time for each unique platform that they offer.

Also included in the environment component 302 is an environment services layer 308 provides services that are environment specific that are accessible by a platform independent portion of the terminal application. The environment component also includes a business logic layer (BLL) 310 which provides functions unique to a specific terminal installation (e.g., gasoline pump, payphone, or vending machine) and is responsible for implementing the business policies of the entity placing the terminal. Examples of the types of business policies that are implemented are those relating to the user interface such as providing a menu for application selection and priorities for selecting an application. Other examples of the types of business policies that are implemented include the types of payment instruments accepted, refund policies, and whether split tenders are permitted. A split tender is a single payment made with more than one payment instrument. For example, a consumer may have only a $2.33 balance on a stored value card and elect to purchase a $3.00 item by tendering the stored value card and $0.67 in coin.

In addition to the environment component, a chip logic component (CLC) 312 includes the platform independent portions of the terminal application. For instance, the CLC may include the appropriate code to enable cash to be dispensed from the terminal without including code specific to the environment component 302. For instance, using a stored value card payment application as an example, the CLC module 312 provides the core functionality to facilitate exchanges between consumer and merchant cards to authenticate the consumer card, determine the purse balance, and debit the purse (e.g., effect a purchase transaction). In addition, environment services are provided by the environment services layer 308 to the CLC module 312. Environment services may include, but are not limited to, accessing peripherals such as a printer and user interface. Thus, the terminal application may access the environment services necessary to run on any terminal.

In order to enable the chip logic component 312 to communicate with the environment component 302, two application programming interfaces are provided. An application programming interface 314 is provided to enable the business logic layer 310 to use the services provided by the chip logic component 312. In addition, a programming interface 316 is provided to enable the chip logic component 312 to communicate with the environment services layer 308. In this manner, the chip logic component (i.e., terminal application) is portable within different terminals. Application programming interfaces 314 and 316 make the function and/or procedure names along with their parameter names and types visible to the layer accessing the application programming interfaces 314 and 316. Accordingly, two application programming interfaces are provided to enable a terminal application, shown as CLC 312, to be written independently of the terminal environment.

Figure 7:
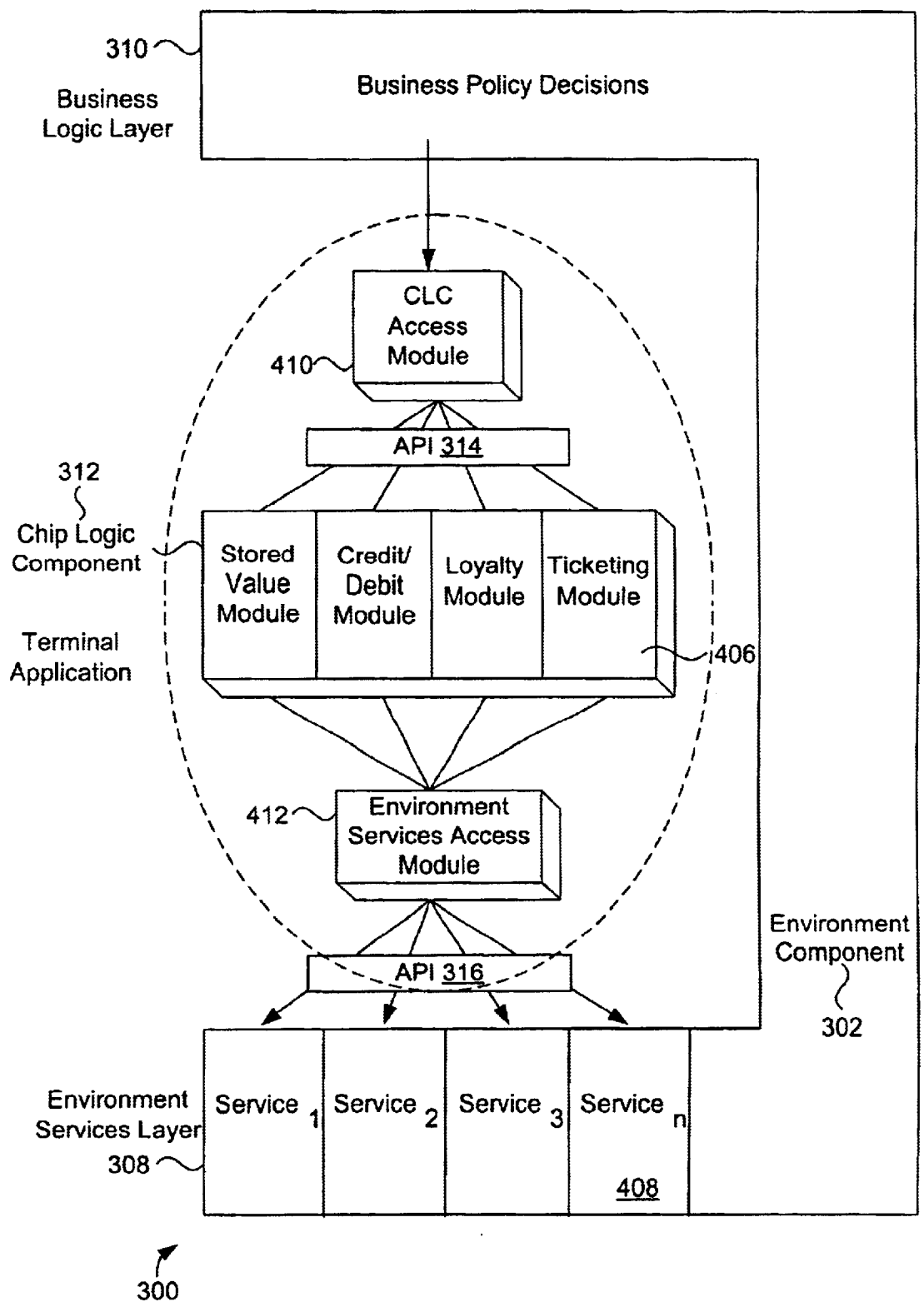
FIG. 7 is a block diagram illustrating in more detail the terminal software architecture of FIG. 8.

FIG. 7 is a block diagram illustrating a terminal architecture according to an embodiment of the invention. As shown, the architecture includes multiple layers. Moreover, the terminal architecture includes two major components. The first component is the environment component 302, which includes the operating system, hardware, and other platform dependent features. As shown, the environment component 302 further includes an environment services layer 308 and a business logic layer 310, as described above.

The second component is the chip logic component (CLC) 312 which represents the environment and platform independent component of a terminal application that will run on the terminal and interact with the card application. As a result, services and functions supported by the CLC 312 are limited to those that are insensitive to a particular operating environment. For example, the CLC 312 does not implement a user interface specifically directed to a local language. As another example, the CLC 312 does not support a data communication protocol employed by external transaction authorizers and acquirers. Instead, the CLC 312 calls upon services provided by the environment component 302 to accomplish tasks that are unique to its installation environment. Accordingly, the CLC 312 is completely portable since it has no hardware dependencies.

As described above, each card application is designed to be compatible with a corresponding terminal application. Since it is often desirable to have multiple card applications be supported by a single terminal, the terminal may support multiple terminal applications. As shown, the chip logic component 312 may include one or more terminal applications, each of which include one or more modules 406. By way of example, CLC modules 406 implement stored-value, credit/debit, loyalty, and ticketing applications. Other modules include an application selection module and card directory modules, described in further detail below.

Each module may be implemented through one or more procedures or functions. Each function and procedure name may be overloaded, and therefore the application programming interfaces may be identical. However, the implementations may differ. In other words, the application programming interfaces may include a single procedure name and associated parameters for use with two separate implementations. As a result, when a card is inserted, the card is identified by the terminal and the appropriate module is invoked. For instance, whether the stored value or the credit/debit module is invoked to perform a debit will depend upon the type of card inserted in the terminal. It is important to note that the CLC modules 406 that implement one or more terminal applications are platform independent.

In order to achieve platform independence, the environment component 302 and the chip logic component 312 interact via optional access mechanisms. These access mechanisms may serve as firewalls to provide security features within the terminal software as well as enable communication between the environment component 302 and the chip logic component 312. More particularly, the business logic layer 310 of the environment component 302 accesses modules in the chip logic component 312 via chip logic component access module 410. When a card is inserted into a terminal, the appropriate modules are selected and activated by CLC access module 410. In other words, CLC access module 410 serves as a gateway to select and activate one or more chip logic component modules, where the modules selected and activated are dependent upon the context (e.g., user-selected command at the terminal) as well as the card inserted.

In addition, an environment services access module 412 enables the chip logic component 312 to access services 408 provided by the environment services layer 308 of the environment component 302. The environment services access module 412 functions similarly to the chip logic component access module 410 to access services in the environment services layer 308. For instance, the environment services access module 412 enables the CLC 312 to select and activate the environment dependent services 408 when the card is inserted into the terminal. Accordingly, the access mechanisms 410 and 412 enable a terminal application to be written and run in a platform independent manner.

While the CLC access module 410 and environment services access module 412 provide security procedures as well as access mechanisms to select and run each module, the access modules 410 and 412 do not directly call the services (e.g., functions and procedures) in the CLC 312 and environment services layer 308 according to one embodiment. Rather, application programming (API) interface 314 provides the business logic layer 310 with access to the services within chip logic component 312. Similarly, application programming interface (API) 316 provides the chip logic component 312 with access to the environment services layer. Thus, CLC access module 410 and the environment services access module 412 access the services in the chip logic component 312 and the environment services layer 308 via application programming interface 314 and application programming interface 316, respectively. As a result, modules within the chip logic component 312 can communicate with a card application when the modules are called via the application programming interface 314. In this manner, the two application programming interfaces 314 and 316 encapsulate services that the terminal architecture provides so that a CLC 312 and therefore a terminal application may communicate with the terminal in a platform independent manner and a card application may communicate with the terminal. Thus, a terminal application that is platform independent may be produced through application of the above-described software architecture. Accordingly, a terminal application including one or more chip logic component modules 406 may be inserted to run on any terminal.

Figure 8:
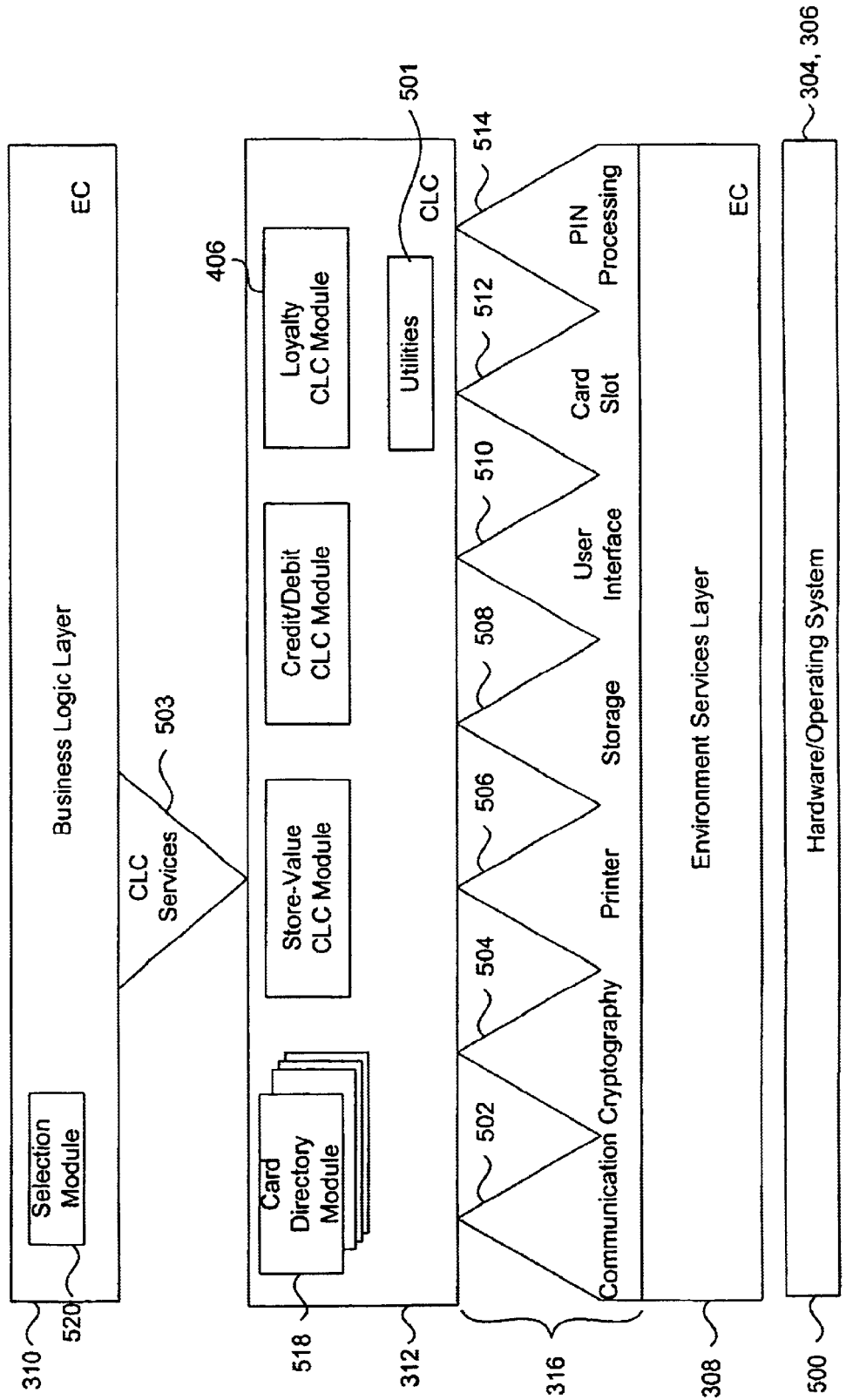
FIG. 8 is a block diagram illustrating the terminal software architecture and exemplary basic environment services.

FIG. 8 is a block diagram illustrating another view of terminal architecture 300 and exemplary CLC services and basic environment services that may be provided. Environment services layer (i.e., environment component) 308 provides a variety of services that are accessed using the environment services access module, shown at block 412 of FIG. 7. As mentioned above, the basic environment services are encapsulated by application programming interface 316 such that they are visible to a terminal application via application programming interface 316. By way of example, an environment service (e.g., a user interface) may be identified in the second application programming interface 316 by the name of its Java interface.

According to one embodiment, all environment services have the same overall structure. For instance, where the architecture is implemented using Java, the environment services include initialize and terminate methods. The terminate methods have the same signature while the initialize methods vary depending on the type of environment service they provide. Once an environment service is obtained (e.g., instantiated) through an appropriate method, the corresponding chip logic component module initializes the services using the initialize method, utilizes the service, and eventually frees the service using the terminate method. Although it is possible to implicitly terminate all active environment services when a CLC module is terminated, there are circumstances in which this behavior is undesirable. For instance, it is possible that a CLC module can transmit an object representing an active service to another CLC module that will be activated after its own end (e.g., by the BLL). Furthermore, it is possible for a BLL or a card directory module (described below in further detail) to access one of the environment services without the mediation of a CLC module. For this reason, terminate services are used to terminate the environment services.

Specific implementations of various environment services may reserve, or "lock," resources that are typically not used concurrently. For instance, a resource that may be reserved is an occupied card slot. Locking mechanisms are therefore platform dependent. To release a reserved resource for subsequent use after the corresponding chip logic component module has completed its functions, the terminate method may be used.

A set of environment services and associated application programming interfaces may be defined and extended over time. The environment services APIs permit the CLC 312 to obtain environment and platform dependent services by calling upon the environment component. These APIs make the CLC 312 portable across platforms. Exemplary basic environment services provided by the environment services layer 308 include communications 502, cryptography 504, and access to peripherals such as printer 506, storage 508, user interface 510, card slot 512, and PIN processing 514. Moreover, these services may be made available for use by different chip logic component modules. In this manner, a minimum set of functions are provided to enable a terminal to perform a transaction.

In the following description, exemplary methods are described that are used to implement each service, in addition to the initialize and terminate functions. For instance, the card slot service 512 is used to communicate with consumer and merchant cards. More particularly, the card slot service is used to access consumer and merchant card interfaces. The card slot service provides a high-level interface designed to be independent of the protocol negotiated between the chip card slot and the chip card and provides a variety of methods for use. Using this service, the Answer to Reset (ATR) of the card from the current card session is returned. In addition, the communication protocol negotiated with the card for the current card session is returned. Moreover, the slot state indicating, for example, that a card is present or that the card is powered on is returned. Other methods power down the card, power on the card if it is not already powered and update the ATR value, and resets the card and updates the ATR value. When the card is powered on, the card's ATR value may then be updated. Card slot service 512 may be extended for stored-value applications to support a network address feature. In this embodiment, methods are provided to return the network address value, set the network address value, set the source address in a network address object, set the destination address in a network address object, get the source address from the network address object and return the source address value, and get the destination address from the network address object and return the destination address value.

The communications service 502 is used by chip logic component modules to exchange data with a remote host computer. This may be required, for example, in a credit card authorization process. Once the connection with the remote host computer is opened and initialized, data may be sent to the remote host computer. Similarly, a response may be received from the host computer. Upon completion, the connection may be terminated and the system resources may be freed.

The usual practice is to encrypt a PIN before it is exported from the PIN pad. However, it is sometimes necessary to provide a PIN that has not been encrypted to a Consumer Card as a part of a cardholder verification procedure. Thus, the PIN processing service 514 is used by chip logic component modules to obtain a PIN that is not encrypted and present it to a consumer card without exposing it. Thus, the PIN processing service 514 is used to securely transfer a PIN to a chip card. Preferably, the PIN is not returned to CLC module 312, but is directly transferred to the card. In this method, the PIN value may be obtained from a consumer and submitted to the card. In another method, a PIN for submission to a remote host computer is obtained and a submission result is returned indicating the status after the PIN is submitted to the card.

The cryptography service 504 is used to access cryptographic and key management functions. In addition, the printing service 506 is used by chip logic component modules to cause information, such as a transaction receipt, to be printed. Thus, upon completion of initialization, information to be printed is transferred to a printer. Upon completion of the transfer of information, object resources may be released.

The printer service 506 provides application-specific information to be printed (e.g., a digital signature to be printed on a receipt). In addition, the storage service 508 provides data services to chip logic component modules. Terminal applications frequently require persistent data storage management for components such as a parameters, transaction batch storage, card exception file listings, etc. The data storage may be implemented through multiple data sets or "files," each of which may be write only, read only or write/read. In addition, various methods may be used to implement this service. For instance, records may be added, modified or deleted from the storage space, and a record containing a specific pattern may be found and returned. Moreover, it may be desirable to test whether the end of the storage space has been reached. Thus, the first, next, or previous record may be returned. In addition, the size of the available space or data in a specific location or object may be returned.

In addition, the user interface service 510 is used by chip logic component modules to display messages and interactively obtain information from clerks and consumers. It is important to note that the user interface is environment and platform-independent. During initialization, the type of user interface (e.g., clerk, consumer) is initialized. Once initialization is performed, information such as value amounts and currency may be displayed. Moreover, an interactive response may be obtained from a clerk or consumer.

The above-described environment services and implementations are merely illustrative. Alternate or further environment services may be described. Moreover, such additions or modifications may be separately downloaded to update one or more terminal applications.

As previously described, according to one embodiment of the invention, access to chip logic component services 503 is provided via the chip logic component access module 410 of FIG. 7. This is accomplished in part through application programming interface (API) 314, which enables the business logic layer 310 to access services 503 in the chip logic component 312. CLC 312 provides directory-related services, application-related services within modules, and utilities; each will now be described in turn. A selection and access mechanism employs methods to launch and terminate the execution of selected ones of these modules 406 from the BLL. According to one embodiment, the mechanism refers to various CLC modules using an identification number, termed a service ID, or "SID." Service IDs are unique to a specific terminal installation. Their assignment is a responsibility of the systems integrator and/or platform provider configuring and placing a terminal.

According to one embodiment, two modules are used to determine which one of the CLC modules 406 to execute: a card directory module 518 and a CLC module selection module 520. However, the use of these two modules by the BLL is optional, since the determination of which CLC module is to be selected may be based on the contents of the card, the depression of a key by a consumer or any other means that implements the business policies of the entity placing the terminal.

First, the card directory module 518 is used to enable the terminal to recognize specific cards. More particularly, the card directory module 518 accesses one or more modules for each card that is recognizable by the card directory module 518. For instance, each of these card directory modules (i.e., services) may be successively launched until one finds the expected information on the card. In this manner, the card directory module 518 determines the availability of card applications resident on an inserted consumer card. The card directory module 518 is designed to return information about the card applications available on an inserted chip card. This information can be obtained from the Answer To Reset (ATR), a card-resident EMB directory, or by other means.

For example, suppose that a "payment" is to be made using a terminal that supports multiple payment types such as stored-value and credit/debit. Further suppose that a stored-value card is tendered. The selection process obtains the SID of the CLC module supporting stored-value. In this example, the SID could be obtained as the result of executing BLL code that performs a card directory search or solicits the choice of payment instrument from the consumer through a user interface.

The chip logic component 312 may easily be updated to recognize a new card through the addition of the appropriate modules. For instance, modules implemented for a new application may include an application CLC, one or more card directory modules for recognizing the card, and a modified application selection module to include the new application in the selection process. A system integrator may therefore manage this process through the implementation of such a framework and managing the runtime environment. Moreover, an updated version of a module that has been modified may easily be downloaded to update the previous version of the module. New CLC modules may be downloaded separately along with their environment services and, if needed, card directory services while changing the selection mechanism to reflect the addition of a new application in the BLL. Accordingly, the terminal application may easily be updated without downloading the entire terminal application.

Second, the BLL 310 includes a CLC module selection module 520 that selects the appropriate module(s) 406 in the chip logic component 312. This is accomplished through selecting from the chip logic component services that are accessible via the first application programming interface 314. More particularly, CLC module selection may be based on information obtained from the card directory module 518 and/or from another source deemed appropriate by the BLL.

Once the BLL has identified the selected CLC module (e.g., by an associated SID), the module can be accessed by an appropriate method. For example, the returned value of the method may be a CLC module object that encapsulates the CLC module. In addition, it is possible to inactivate the CLC module. According to one embodiment, the encapsulation of the CLC module is used as an authentication token insuring that the CLC module can be terminated only by the process that launched it.

In addition to the card directory module 518, the chip logic component 312 includes one or more modules 406 that are used to provide application-related services to the business logic layer 310 of the environment component. Examples of high-level functions within the domain of payment applications include payment functions that effect a credit, debit, or stored value card payment, or add points to a loyalty program card. Each one of the services may be implemented by one or more chip logic component modules 406. Thus, each one of the chip logic component services may be accessed by the business logic layer 310 through application programming interface 314.

These chip logic component services may include, for example, services for financial applications. For instance, a "Load" command may be used to credit (i.e., add) value to a stored value card. In addition, a "Micro-Payment" command may be implemented. Micro-payments are generally associated with stored value cards and the purchase of a "flowing product" such as a telephone call or gasoline. Flowing product dispensers (e.g., a public telephone, a gasoline pump) use a micro-payment mechanism to obtain incremental payments from a stored value card as the product is being dispensed. The "Micro-Payment" command may therefore be used to initiate a micro-payment sequence, debit the stored value card by the indicated amount, and terminate the micro-payment sequence. Similarly, a "Payment" command causes a payment transaction to be executed and may be applicable to a wide variety of payment instruments including credit, debit and stored value card-based transaction. For instance, the payment amount and currency may be passed as parameters. Moreover, a "Stored Value" command may be used to cause a balance inquiry transaction to be executed. Other possible commands are commands used to load a value to a stored value card, implement electronic couponing, and redemption of coupons. Thus, these commands implemented by the chip logic component layer are visible to the business logic layer. Each command may also be implemented by one or more modules within a terminal application. In addition, a command such as a "payment" command may be available for both stored-value and credit/debit transactions. Moreover, each command may be implemented in a variety of ways to accommodate the differences in modules and terminal applications.

As described above, various services may be implemented through the use of one or more chip logic component modules 406. Moreover, each chip logic component module 406 may access a number of utilities. In other words, a utility may be common to multiple modules. Utilities may be provided that are useful in a broad range of applications. By way of example, it may be desirable to convert values such as byte arrays into numerical values. As yet another example, it may be desirable to provide a set of procedures that may be used by an EMV smart card. These procedures may include, for example, requesting that the card application verify a cryptogram; sending transaction-related data to the card, which computes and returns a cryptogram; retrieving data that is not encapsulated in a record within the current card application; initiating a transaction with the card; and performing an "on-card" comparison of a supplied PIN with the PIN contained within the card application. Other utilities include TLV processing (e.g., as disclosed in ISO 7816) and EMV utilities for composing TLV data and extracting TLV information for TLV contructs.

Figure 6:
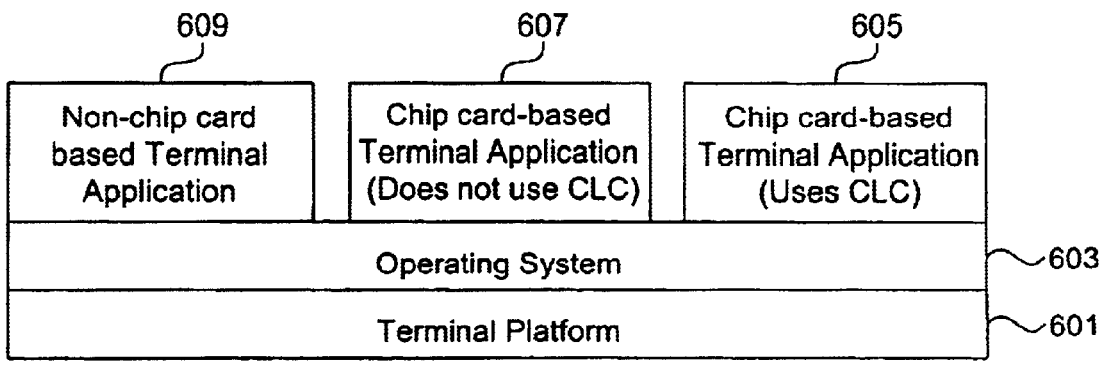
FIG. 6 is a block diagram illustrating an environment in which the present invention may be implemented.

Referring now to FIG. 6, an environment in which the present invention may be implemented is illustrated. The environment includes a terminal platform 601 and operating system 603. As shown, chip card-based 605, 607 and non-chip card-based 609 terminal applications may coexist in the same terminal. More particularly, a chip card-based terminal application 605 that uses the CLC may coexist with a chip card-based terminal application 607 that does not use the CLC. Preexisting terminal applications, chip or non-chip card-based, need not be re-written as they will continue to be executed as they were using traditional terminal architectures. Alternatively, preexisting terminal applications may be rewritten using the terminal architecture of the present invention. Thus, the platform independent portions of the terminal applications can be implemented by a CLC module or services can continue to be obtained from the operating system using traditional terminal architectures.

Module Access and Selection

Figure 9:
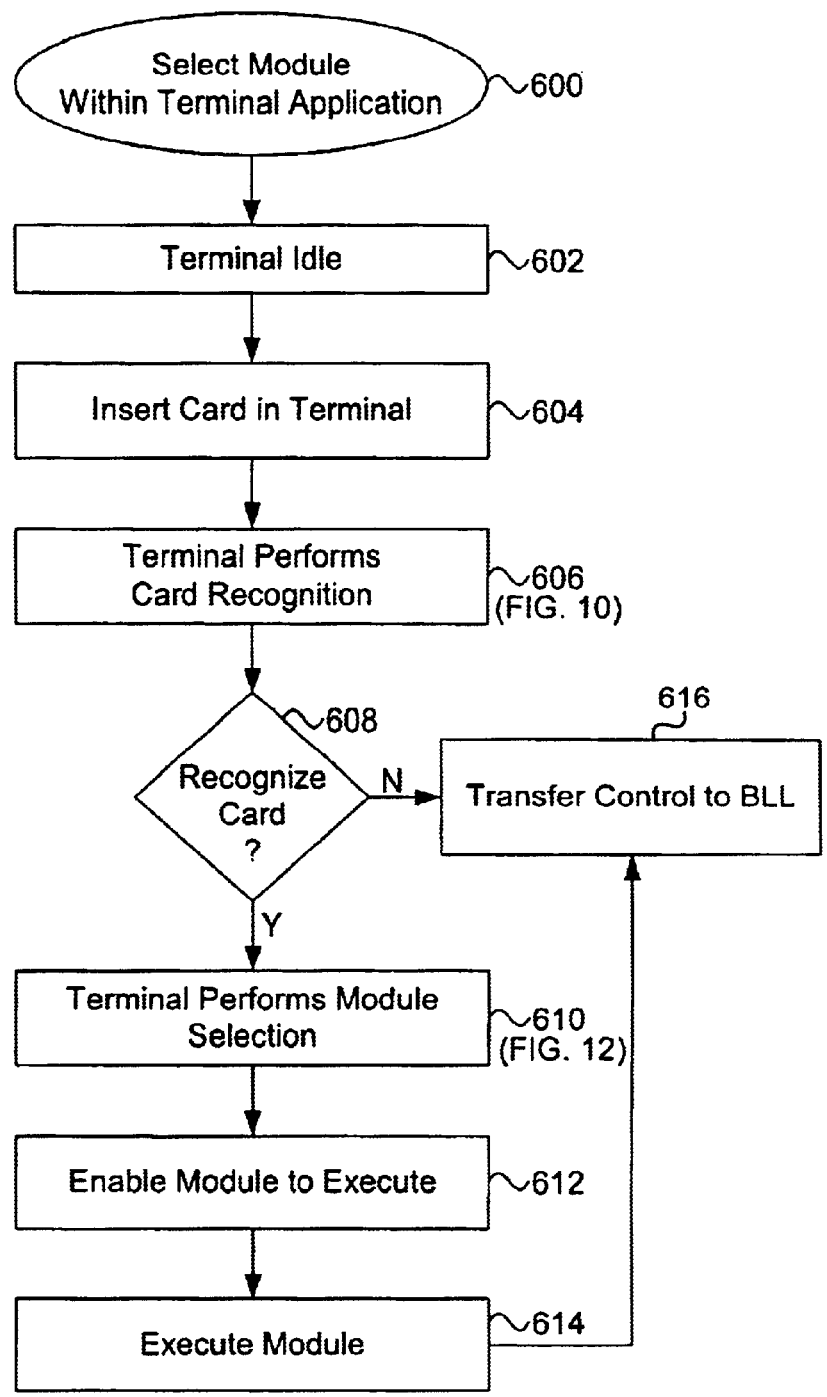
FIG. 9 is a process flow diagram illustrating a method of executing a terminal application according to an embodiment of the invention.

Referring now to FIG. 9, a method of executing a terminal application according to an embodiment of the invention is illustrated. As will be described, during execution of the terminal application, a module within the terminal application (i.e., chip logic component) is selected. Previously, the terminal application has been written and loaded into the terminal. The process begins at block 600 and the terminal remains idle as shown at block 602 until a card is inserted in the terminal at block 604.

When a card is inserted into the terminal, the card may or may not be recognizable. Thus, before the terminal attempts to communicate with the card, the terminal attempts to recognize the card. Thus, once the card is inserted in the terminal, the terminal performs card recognition at block 606. One method of performing card recognition will be shown and described in further detail with reference to FIG. 10. If it is determined at block 608 that the card is recognized, the card information 800 that identifies the card application is returned to the business logic layer. Then, in order to communicate with the card application, the terminal selects the appropriate CLC module at block 610. In other words, the card information 800 that identifies the card application is used to select a corresponding CLC module as the current module. For example, once the SID is identified, the corresponding CLC module can be accessed. The terminal then enables the CLC module to execute at block 612, thereby enabling communication with the card. For instance, in object-oriented programming, modules are instantiated prior to execution. The terminal then executes the module (e.g., debit/credit) at block 614. Control is then transferred to the business logic layer at block 616, which remains idle until a card is inserted or a selection is made by the consumer. If it is determined at block 608 that the card is not recognized, control is similarly transferred to the business logic layer at block 616. Since the card information has been returned to the business logic layer, the business logic layer may determine the appropriate action. By way of example, the card may be rejected. As yet another example, the card may be reclaimed by the terminal.

Figures 10, 11:
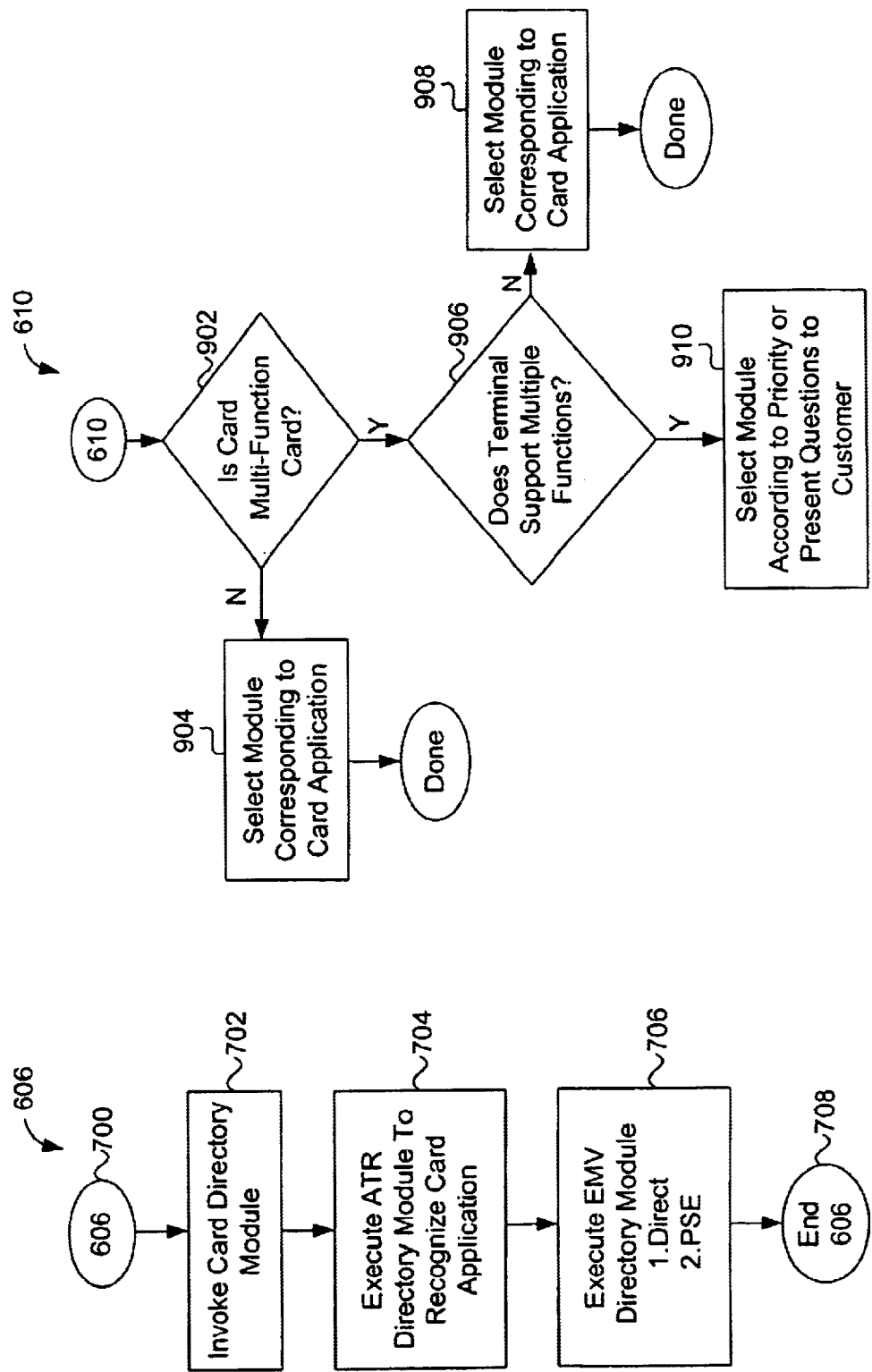
FIG. 10 is a process flow diagram illustrating one method of performing card recognition as shown at block 606 of FIG. 9.
FIG. 11 is a process flow diagram illustrating one method of performing module selection as shown at block 610 of FIG. 9.

As described above, when a card is inserted into a terminal, the terminal (e.g., environment component) determines whether it recognizes the card application on the card. FIG. 10 illustrates one method of performing card recognition as shown at block 606 of FIG. 9. According to one embodiment, card recognition is accomplished through the card directory module 518, shown and described above with reference to FIG. 8. Once called by the business logic layer 310, the card directory module determines the availability of card applications resident on an inserted consumer card. This is accomplished by successively launching each of the card directory services available to the card directory module 518 until one or more services are found that match the information on the card. For instance, a card directory service may be designed to recognize a stored-value card from Visa, while another card directory service may be designed to recognize a stored value card from Proton. Since a card may include multiple card applications (e.g., stored value, loyalty, credit), there may be multiple services that match the information on the card. It is important to note that the card directory services may easily be updated or added by downloading specific services as needed into card directory module 518.

Card recognition may be performed using a variety of card recognition schemes, such as that described below with reference to FIG. 10. The process begins at block 700 and at block 702 the card directory module 518 is invoked. The Answer to Reset (ATR) directory module is then executed to recognize a stream of bits coming from the card at block 704. The ATR is a construct defined in ISO 7816-3 that contains information regarding the card and applications on the card. Next, the EMV directory module is executed at block 706 to recognize a data or file structure (e.g., application identifier) on the card. Various mechanisms may be used for application selection. For example, a direct mechanism may be used to recognize the application by an application ID or partial application ID. As another example, a PSE mechanism may be used to recognize the application through a Payment System Environment (PSE) construct on the card. Both the direct mechanism and the PSE mechanism are defined in the EMV '96 specification version 3.1.1. The process ends at block 708. A data structure storing card information including the application identifier identifying the particular card application may then be created based upon the information received in steps 704 and 706, and then returned to the business logic layer. As shown and described above with reference to FIG. 10, a data structure stores the card information that is returned to the business logic layer upon completion of card recognition.

Where multiple card applications are supported on a single card, one of the applications may be selected through a priority scheme or interactively with the user. FIG. 11 is a flow diagram illustrating one method of performing module selection as shown at block 610 of FIG. 9. More particularly, the module selection is performed through a selection module as shown at block 520 of FIG. 8. In order to select the appropriate module, it is determined at block 902 whether the card is a multi-function card. In other words, it is determined whether more than one card application is resident on the card.

If the card is not a multi-function card, the module corresponding to the card application is selected at block 904. However, if the card is determined to be a multi-function card, it is then determined whether the terminal supports more than one of these functions at block 906. If the terminal application supports only one of the multiple card applications, the module corresponding to the supported card application is selected at block 908 by the terminal (e.g., by the business logic layer). By way of example, the terminal may support only one function (e.g., stored value or credit/debit). As yet another example, the terminal may support multiple functions, but only one function that is supported by the card application. If the terminal application supports more than one of the multiple card applications, there are multiple modules that may be selected. The module selection may be made as a business decision or a customer decision. Thus, the terminal (e.g., the business logic layer) may select one of the modules according to a mechanism such as a priority scheme. Alternatively, one of the modules may be selected by the customer interactively. By way of example, the customer may be presented with a question or a menu for selection of one of the terminal supported card applications. Thus, the module selection may be performed in a variety of ways. The particular implementation may be designated by the business logic layer or the terminal vendors.

As described above with reference to FIG. 11, the determination of the number of applications resident on the card and the number of functions supported by the terminal may be performed. However, this description is merely illustrative and the identification of functions supported by the card and the terminal may be performed without such a determination.

Figure 12:
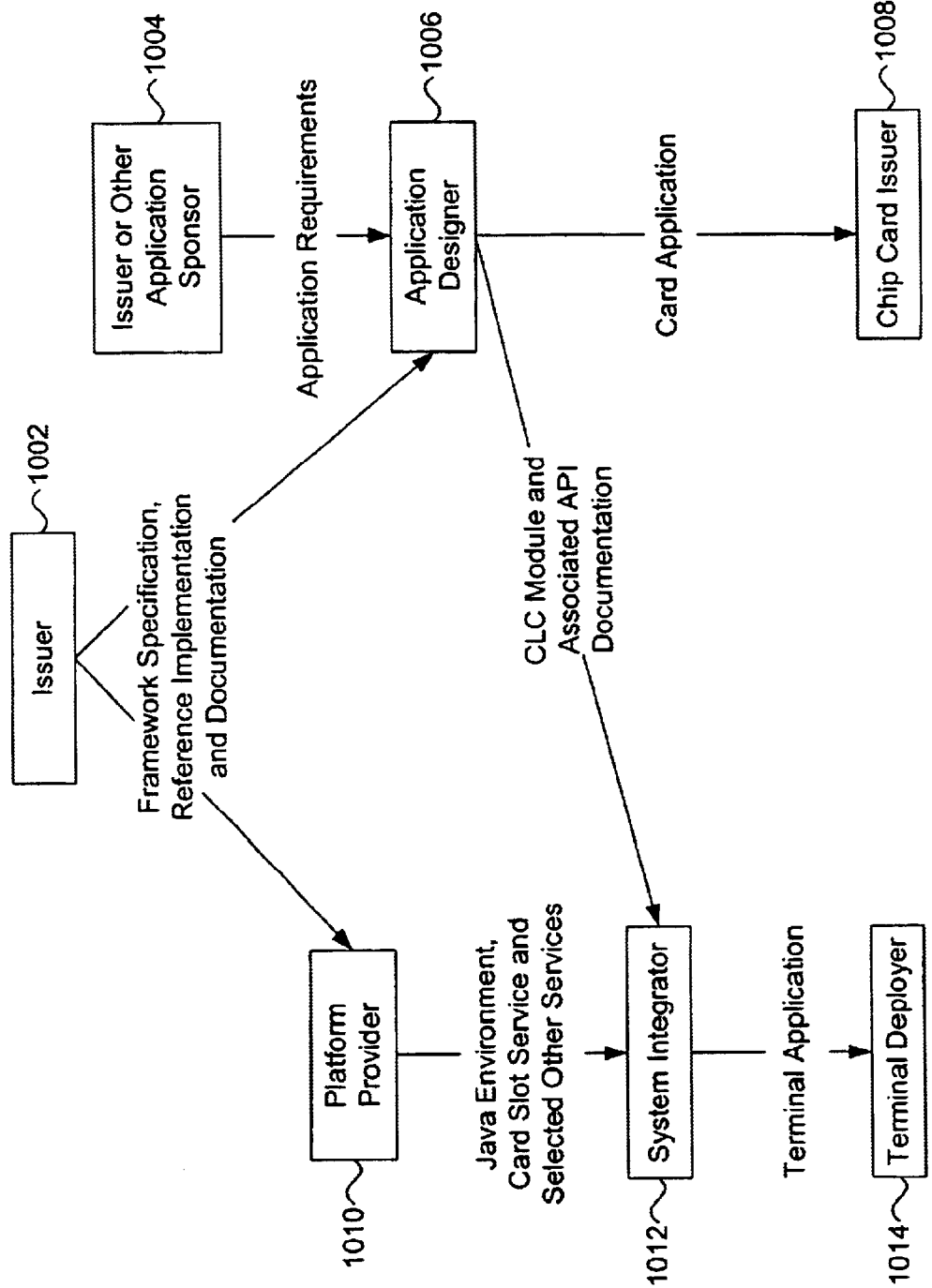
FIG. 12 is a general diagram illustrating the software development roles of various entities when working with the terminal architecture of the present invention according to one embodiment.

Referring now to FIG. 12, a general diagram illustrating the software development roles of various entities when working with the terminal architecture of the present invention according to one embodiment is presented. As shown, issuer 1002 (e.g., Visa) provides a specification, and may further provide a "reference implementation" which is a particular implementation of the specification, and associated documentation. In addition, the issuer or other application sponsor 1004 may provide further application requirements for use by an application designer 1006 who implements the specification for a card application. For instance, the application designer 1006 may develop the card application as well as a CLC module supporting the application. In addition, the application designer 1006 develops documentation describing the services provided by the CLC module to the programmer implementing the BLL. The documentation will also define the environment services required by the CLC module that must be supplied by the systems integrator 1012 and/or platform provider 1010. The card application is then provided to a chip card issuer 1008.

As shown, the specification is provided in parallel by the issuer 1002 to a platform provider 1010. The platform provider 1010 (e.g., terminal manufacturer) supplies terminal equipment, operating system, physical device drivers, and implements the terminal architecture and Java environment in which to execute the CLC and application independent environment services (e.g., card slot services). Thus, the platform provider uses the specification to create services such as the card slot service described above. In addition, the platform provider 1010 establishes a Java Environment as appropriate. Moreover, the platform provider 1010 creates and documents a mechanism for registering CLC modules and environment services.

A systems integrator 1012 is responsible for implementing the BLL of the EC and the application dependent environment services (e.g., communications services for connecting to a remote host computer). The systems integrator 1012 accepts CLC modules and associated documentation from various application designers. Using these CLC modules, documentation, and the platform provider's registration mechanism, the system integrator 1012 creates data structures required for the EC business logic layer to access CLC services and for the CLC to access EC environment services. The terminal application is then provided to a terminal deployer 1014. In this manner, the production of compatible terminal and card applications may be performed in parallel without requiring substantial verification testing.

Various tables may be used to store various modules and services. According to one embodiment, a card directory services table is used to identify the available card directory services (e.g., ATR, EMV, etc.). In addition, a CLC module table is used to identify the available CLC modules (i.e., the terminal applications supported). Moreover, an environment services table is used to identify which environment service implementation is to be used by a specific CLC module for a requested service type. The tables may be dynamically updated by system integrators when a terminal application is added to a terminal platform or modified.

Figure 13:
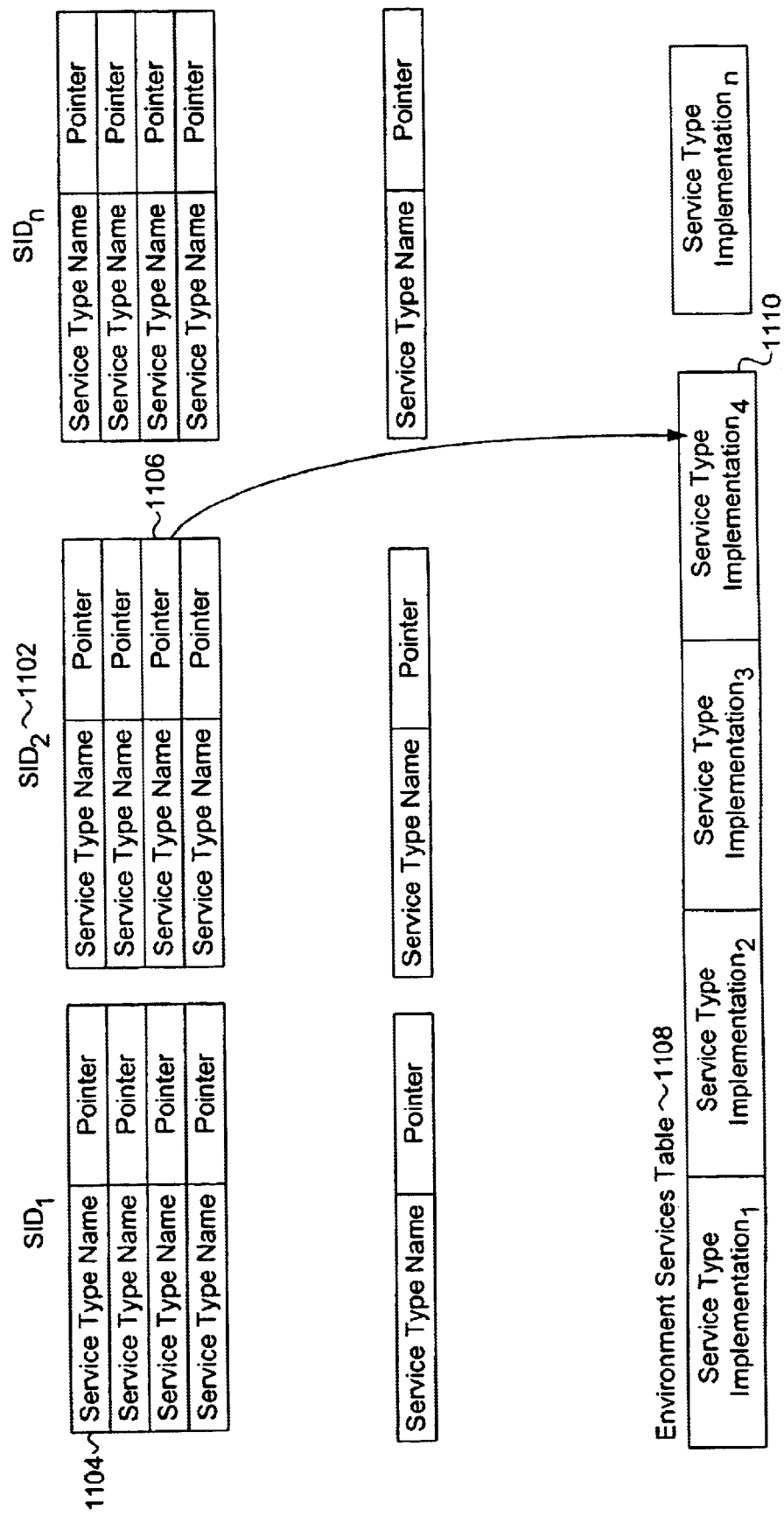
FIG. 13 is a block diagram illustrating an environment services table according to one embodiment of the invention.

FIG. 13 illustrates an environment services table according to one embodiment of the invention. Multiple implementations may be supported for a single service type. For example, the print service could have two different implementations, one used by a credit CLC module and another used by a stored value CLC module. Although the service request is the same in both cases except for the content of the parameters, receipts having different formats might be produced.

As shown in FIG. 13, a 2-column by n-row table exists for each CLC module and is addressed using the SID 1102 of the active CLC module. The first column 1104 contains a string naming an environment service type (e.g., name of the Java interface of the service) to be used by the CLC module. The second column 1106 contains the index (e.g., pointer) into the environment services table 1108 indicating the implementation 1110 of the named service to be used. In addition, a table entry is included to reference the environment services potentially used by the BLL when no CLC module has been launched.

The present invention provides methods and apparatus for ensuring compatibility of terminal and card applications produced in parallel. This is accomplished through providing a terminal architecture that permits terminal applications to be written independent of the operating system and hardware of the terminal.

Alternative Embodiments

According to one embodiment, the present invention is implemented in JAVA to create a higher degree of portability. The Java platform environment should preferably have the following characteristics: single-threaded, external linking, a variety of data types (e.g., boolean, byte, char, integer, long, short, string), one-dimensional arrays, garbage collection, means to download modules, and ability to execute a substantial application in a 128 K byte physical memory space (including application, stack, Java VM and run-time environment). However, any object-oriented language or other suitable language such as C++ may be used.

A terminal having the terminal architecture of the present invention is preferably capable of supporting multiple applications. In addition to supporting smart card-based products, the terminal is capable of supporting a variety of smart card-based and non-smart card-based applications. Moreover, applications are not limited to payment functions but could include many other applications such as consumer loyalty programs, electronic coupons, identification, etc.

There should be sufficient memory capacity in a terminal having the disclosed terminal software architecture. For instance, the memory must be sufficient to accommodate the operating system, the environment component, the CLC, any Java VM environment used to implement the CLC, and persistent data (e.g., transaction records) required by the terminal application. However, a CLC module should make no assumptions about the memory management or file system capabilities of the terminal. Persistent data should be delivered to, and accepted from, the environment component via service requests.

Event handling may be performed asynchronously by a terminal manufactured according to the present invention. More particularly, the environment component is responsible for asynchronous event handling. Asynchronous events are typically the result of external inputs such as key depression or the insertion/removal of a card. Thus, a CLC module may make service requests of the EC to initiate event processing such as obtaining consumer or clerk responses or communicating with a remote computer.

According to one embodiment, the CLC is single-threaded in order to assure that it can be used in relatively simple terminals. As a result, environment component requests for CLC services are "blocking." In other words, the environment component cannot issue a subsequent request until the previous one has completed and the CLC returns control to the environment component (e.g., BLL). Similarly, service requests made by the CLC of the environment component are also blocking. Thus, the CLC cannot issue a subsequent service request to the environment component until the previous request is completed and the environment component returns control to the CLC.

Varying execution speed expectations apply to various environments (e.g., supermarket versus transit turnstile). Thus, the execution speed of a terminal having the disclosed terminal architecture satisfies the required transaction speed for each application in the specific environment in which it will be deployed.

A terminal manufactured with the terminal architecture of the present invention has a primary chip card acceptor used to accept a consumer card. Depending on the terminal applications supported, the terminal may be required to concurrently accept a merchant card. In addition, various payment terminal applications require specialized support such as a PIN pad and/or data communication access to a remote computer.

Although the foregoing invention has been described in some detail for purposes of clarity of understanding, it will be apparent that certain changes and modifications may be practiced within the scope of the appended claims. For instance, although exemplary environment services are described, these are merely illustrative and therefore the environment component may include additional or alternate environment services. In addition, a terminal application may include a variety of modules other than those listed. It should be apparent that the present invention has an almost limitless range of applications and that it would be difficult to describe all of them in a single document; however, the reader will appreciate the broad scope of the invention. Therefore, the described embodiments should be taken as illustrative and not restrictive, and the invention should not be limited to the details given herein but should be defined by the following claims and their full scope of equivalents.

What is claimed is:

1. A terminal for accepting a card that implements a card application of a merchant, the terminal comprising:
   hardware of the terminal;
   an operating system of the terminal; and
   an environment services software layer of the terminal that supplies one or more environment dependent software services that are dependent upon at least one of the operating system and the hardware of the terminal;
   a terminal application of the terminal compatible with the card application and having a platform independent portion that is independent of the hardware and operating system of the terminal, whereby the terminal application is developed independently of the hardware and operating system of the terminal, the platform independent portion including at least one of a stored value application, a credit application, a debit application, and a loyalty application; and
   an application programming interface that enables the terminal application to communicate with the environment services software layer, wherein the environment dependent software services provided by the environment services software layer are accessible by the platform independent portion of the terminal application through the application programming interface;
   wherein the card is a smart card and the terminal is arranged to accept smart cards.

2. The terminal as recited in claim 1, further comprising: an environment services access module that enables the terminal application to select and activate the environment dependent software services provided by the environment services software layer when the card is inserted into the terminal.

3. The terminal as recited in claim 1, wherein the environment dependent software services are accessible by the platform independent portion of the terminal application.

4. The terminal as recited in claim 1, wherein each of the environment dependent software services have an identical structure.

5. The terminal as recited in claim 1, further comprising:
   an application programming interface that encapsulates the environment dependent software services such that the environment dependent software services are visible to the terminal application.

6. The terminal as recited in claim 1, further comprising a business logic layer responsible for implementing business policies of an entity associated with the terminal.

7. The terminal as recited in claim 6, wherein the terminal application includes one or more modules associated with one or more commands accessible to the business logic layer.

8. The terminal as recited in claim 7, wherein the business logic layer includes a module selection module for selecting from the modules by calling selected ones of the commands.

9. The terminal as recited in claim 6, further including a terminal application access module that enables the business logic layer of the environment component to select and activate one or more modules within the terminal application when the card is inserted into the terminal.

10. The terminal as recited in claim 9, wherein the modules selected and activated are dependent upon the card inserted into the terminal and user-selected command at the terminal.

11. The terminal as recited in claim 6, further including:
    a first application programming interface that enables the terminal application to communicate with the environment services software layer, wherein the environment dependent software services provided by the environment services software layer are accessible by the platform independent portion of the terminal application through the application programming interface; and
    a second application programming interface that enables the business logic layer to communicate with the terminal application.

12. The terminal as recited in claim 11, wherein the environment dependent software services are implemented by one or more procedures and associated parameters and wherein the first application programming interface enables visibility of names of the procedures and associated parameters to the terminal application accessing the first application programming interface.

13. The terminal as recited in claim 11, wherein the terminal application is implemented by one or more modules and wherein the second application programming interface enables visibility of the modules to the business logic layer accessing the second application programming interface.

14. The terminal as recited in claim 13, wherein each of the modules includes one or more procedures and associated parameters and wherein the second application programming interface enables visibility of names of the procedures and associated parameters.

15. The terminal as recited in claim 1, wherein the environment dependent software services include services that enable peripheral devices to be accessed.

16. The terminal as recited in claim 15, wherein the peripheral devices include at least one of a printer and a user interface.

17. The terminal as recited in claim 1, wherein the terminal application is portable on a plurality of terminals manufactured by different terminal manufacturers.

18. The terminal as recited in claim 1, wherein the terminal application includes a card directory module capable of recognizing one or more cards.

19. The terminal as recited in claim 18, wherein the terminal application further includes one or more modules associated with the cards and the card directory module accesses selected ones of the modules when one of the cards is inserted into the terminal.

20. A method of executing a terminal application on a terminal suitable for accepting a card implementing a card application of a merchant, the method comprising:
    performing card recognition to determine whether the card is recognized by a terminal application, the terminal application including one or more modules associated with one or more commands accessible to a business logic layer and having a platform independent portion that is independent of the hardware and operating system of the terminal, the platform independent portion in communication with the business logic layer and including at least one of a stored value application, a credit application, a debit application, and a loyalty application;
    when it is determined that the card is not recognized, transferring control to the business logic layer, the business logic layer responsible for implementing business policies associated with the terminal; and
    when it is determined that the card is recognized, selecting one of the modules, executing the selected module, and transferring control to the business logic layer upon completion of execution of the module;

wherein the card is a smart card and the terminal is arranged to accept smart cards.

21. The method as recited in claim 20, further including:

providing card information associated with the card to the business logic layer.

22. The method as recited in claim 21, wherein the card information includes information associated with a card application.

23. The method as recited in claim 21, wherein the card information includes information associated with multiple card applications resident on the card.

24. The method as recited in claim 20, further including:

performing at least one of rejecting and reclaiming the card at the business logic layer when the card is not recognized.

25. The method as recited in claim 20, wherein performing card recognition includes:

invoking a card directory module of the terminal application, the card directory module being associated with one or more card directory services suitable for recognizing one or more cards; and launching the card directory services available to the card directory module until one or more of the card directory services are found that match information on the card.

26. The method as recited in claim 20, wherein when the card is recognized, the method further includes:

selecting at the business logic layer one of the modules associated with the card application.

27. The method as recited in claim 20, wherein when the card is recognized, the method further includes:

ascertaining whether the card is a card that supports multiple functions; and selecting one of the modules associated with the card application when it is ascertained that the card does not support multiple functions.

28. The method as recited in claim 27, wherein when it is ascertained that the card supports multiple functions, the method further includes:

determining whether the terminal supports multiple functions;

when it is determined that the terminal does not support multiple functions, selecting one of the modules associated with the card application; and when it is determined that the terminal supports multiple functions, selecting one of the modules according to at least one of priority and a user selection.

29. The terminal as recited in claim 20, wherein the card is a smart card and the terminal is arranged to accept smart cards.

30. A terminal arranged to accept a card and implement a terminal software application, the terminal comprising:

terminal hardware;

a terminal-dependent operating system;

an environment services software layer that provides one or more environment dependent software services that are dependent upon at least one of the terminal hardware and the terminal-dependent operating system;

a first application programming interface through which a terminal software application may access the environment services software layer;

a business logic software layer that implements business policies associated with the terminal;

a second application programming interface through which the business logic software layer may access the terminal software application, whereby the terminal software application may be developed independently of the terminal; and a terminal software application having a platform independent portion that is independent of the hardware and operating system of the terminal, whereby the terminal application is developed independently of the hardware and operating system of the terminal, the platform independent portion including at least one of a stored value application, a credit application, a debit application, and a loyalty application, the terminal software application being arranged to make calls to the first application programming interface to access the environment services software layer, and being arranged to respond to calls from the second application programming interface for the business logic layer;

wherein the card is a smart card and the terminal is arranged to accent smart cards.

31. The terminal as recited in claim 30, further comprising:

an environment services access module that enables the terminal software application to select and activate the environment dependent software services provided by the environment services software layer when the card is inserted into the terminal.

* * * * *